United States Patent [19]

Mayer

[11] Patent Number: 4,521,971
[45] Date of Patent: Jun. 11, 1985

[54] MEASURING HEAD FOR SCREW THREAD MEASURING MACHINES

[75] Inventor: Manfred Mayer, Oberndorf, Fed. Rep. of Germany

[73] Assignee: Mauser-Werke Oberndorf GmbH, Fed. Rep. of Germany

[21] Appl. No.: 502,125

[22] Filed: Jun. 8, 1983

[30] Foreign Application Priority Data

Jun. 16, 1982 [DE] Fed. Rep. of Germany ....... 3222583

[51] Int. Cl.³ .............................................. G01B 5/16
[52] U.S. Cl. ..................................... 33/199 B; 33/201
[58] Field of Search ............. 33/199 R, 199 B, 174 L, 33/201

[56] References Cited

U.S. PATENT DOCUMENTS

| 2,634,508 | 4/1953 | Stainton | 33/199 R |
| 2,803,066 | 8/1957 | Praeg | 33/199 B |
| 3,052,035 | 9/1962 | Shuster | 33/199 R |
| 3,504,441 | 4/1970 | Linley et al. | 33/199 B X |

*Primary Examiner*—William D. Martin, Jr.
*Attorney, Agent, or Firm*—McGlew and Tuttle

[57] ABSTRACT

A measuring head for screw thread measuring machines which is capable of measuring threads of a piece to be measured which has an outer diameter with a measuring point and which may be of varied diameters within predetermined limits comprises a base plate which has a thruhole in its center, a plurality of straight support grooves. Feelers are arranged at spaced angular locations around the periphery of the hole and a centering disc is located within the hole as well as measuring elements which are similarly offset and clamping elements which are arranged at selected angular locations to engage the centering disc. The feelers and the measuring elements are carried in a measuring station which is movable along a groove which extends parallel to a straight line which intersects a measuring point on the diameter of the piece to be measured and the lowermost point of the piece at the location in which it intersects the vertical axis.

9 Claims, 2 Drawing Figures

MEASURING HEAD FOR SCREW THREAD MEASURING MACHINES

FIELD AND BACKGROUND OF THE INVENTION

This invention relates in general to measuring devices and in particular to a new and useful measuring head which makes it possible to measure various pieces which may be of different diameters.

Known are fully automatic measuring machines equipped with an annular measuring head with a central hole. On the annular surface of the head, measuring elements are mounted for displacement. Such measuring heads are employed particularly for measuring outer threads of large tubes or pipes. What is disadvantageous is that with varying outer diameters of the threads or tubes, the measuring head must be readjusted time and again, to get the thread located coaxially with the annular measuring head. For this purpose, either the measuring head must be moved in the plane perpendicular to its central axis, or the support of the tube must be moved to the proper level, for example. This must be done in advance, is time consuming, requires precision in adjustment, and is very expensive.

SUMMARY OF THE INVENTION

The invention is directed to a measuring head permitting thread measuring operation from a steady, fixed position and with an unchanged support of the measured pieces having a variety of outer diameters.

In accordance with the invention there is provided a measuring head for screw threaded measuring machines which is capable of measuring threads of a piece to be measured which has an outer diameter with a measuring point and which may have an outer diameter of varying sizes. The head comprises a base plate having a thruhole with a plurality of straight line support grooves defined therein and with clamping and measuring elements displaceably received in the grooves. The plate has a vertical cross-sectional axis through the thruhole which will coincide with the vertical axis of the outer diameter of the measured piece. The measured piece is centered in the measuring head by the clamping elements which are uniformly distributed around the outer diameter of the piece being measured. The measuring elements are distributed uniformly around the outer diameter of the measured piece and they are displaceable in associated straight support grooves from an outer position to an inner position in which they contact the measured piece at a measuring point. Support grooves extend parallel to a straight line connecting a measured point on the piece being measured at its outer diameter and with a point at which the vertical cross-sectional axis of the outer diameter of the measured piece and the lower circular arc portion thereof intersect.

This design with clamping and measuring elements makes it possible to leave the support of the measured piece as well as the position of the measuring head or base plate thereof unchanged, irrespective of the outer diameter of the measured piece. With a constant position of the vertical cross-sectional axis, only the horizontal cross-sectional axis changes its position, namely upwardly with the increasing outer diameter of the piece to be measured. The measuring points change their positions along a straight line extending upwardly under various inclinations. If equidistantly arranged, six measuring elements are provided, and they are located on a full circle offset through 60°. This is true for both the smallest and and the largest measurable outer diameter, and also for any diameter therebetween. The straight line along which the measuring point migrates extends from a measuring point thus determined on the outer diameter, to the lower point of intersection of the outer diameter with the vertical cross-sectional axis. Because of their finite dimensions, the measuring and clamping elements are designed to be displaceable on the base plate along a groove which is parallel to the straight line. Due to this spacing in parallel extension, the point of intersection of the grooves with the vertical axis is displaced downwardly, below the lowest point of the outer diameter. The solution is simple, does not require additional expenses, and saves time necessary for adjustment. If a V-shaped supporting channel is used instead of a flat horizontal surface, the point of intersection of the vertical cross-sectional axis with the straight lines is displaced downwardly, proportionally to the diminishing outer diameter of the measured piece and to the angle of the V-shaped support.

While embodying the invention, altogether three clamping elements offset through 120° may be provided, of which one is displaceable against the top of the measured piece, along the vertical cross-sectional axis of the thruhole. At the same time, altogether six measuring elements offset through 60° may be provided, of which two are mounted at opposite locations on the horizontal cross-sectional axis.

Further, according to a development of the invention, each measuring element may be associated with a feeler which is mounted for being moved into contact with the contact face of a centering disc of a size conformed to the outer diameter of the piece to be measured. Upon inserting such a centering disc, the feelers are moved from an outer into an inner position until all of them are in contact with the disc. This is the central starting position valid also for the measuring and and clamping elements, since with the feelers in contact with the centering disc, the measuring and clamping elements are aligned simultaneously and can perform their functions.

In addition to the clamping and measuring elements and feelers, a locator pin may be provided which is mounted for being moved along the vertical cross-sectional axis into contact with the lowermost point of the outer diameter of the measured piece, and determines the measuring position along the longitudinal axis of the piece to be measured. In accordance with the invention, the measuring elements may be combined with the feelers to a station which, as a unit, is displaceable on the base plate along a groove. To make the measuring element retractable from their measuring point, they may be associated with spring parallelograms.

The result of measurement may be delivered to an evaluation in an inductive way. Further, an actuator cylinder may be associated with the locator pin and/or the feelers.

Equal functions may be assigned to all the measuring elements of a station, with the stations being distributed over the circumference. However, the measuring elements of individual stations may also perform different functions or accomplish different measuring tasks. These tasks may be to measure:

In station 1: the radius, pitch, lead angle of the thread,
In station 2: the depth, radius, lead angle of the thread, In station 3: the taper, diameter, lead angle, flat of the thread,
In station 4: the radius, depth, lead angle of the thread,
In station 5: the taper, radius, lead angle of the thread,
In station 6: the form, radius, lead angle, flat of the thread.

Accordingly, it is an object of the invention to provide an improved device for measuring parts or pieces which have varying diameters.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
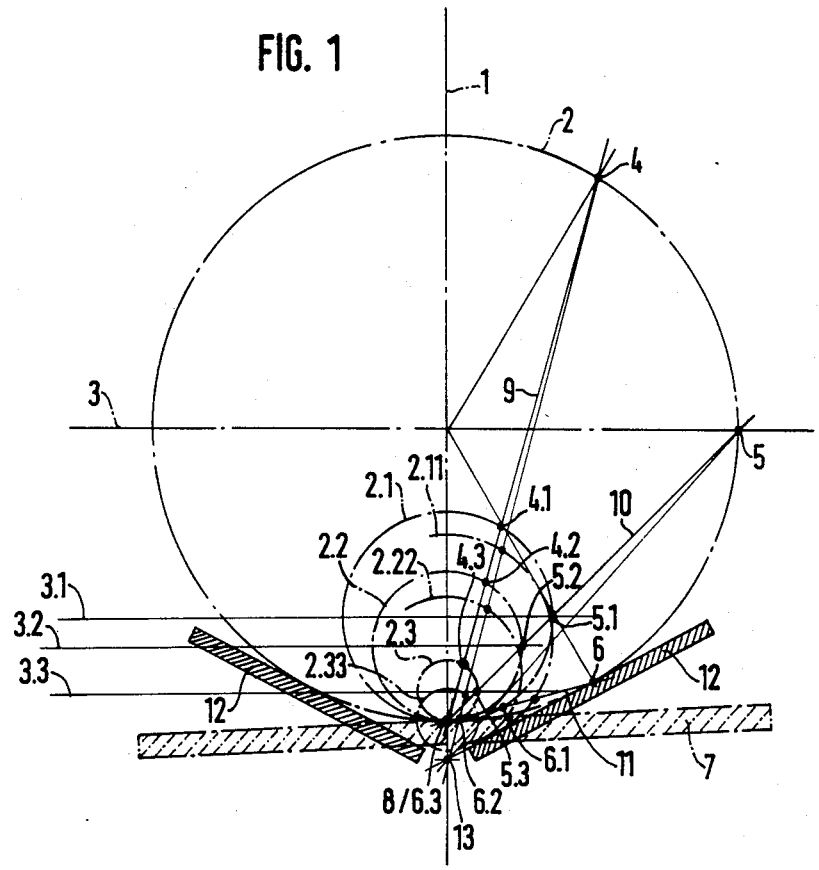
FIG. 1 is a schematical partial sectional view indicating the function of a measuring head constructed in accordance with the invention.

Referring to the drawings, in particular the invention embodied therein comprises a measuring head for screw thread measuring machines which is capable of measuring threads of a piece having an outside diameter 2 of any size within predetermined limits. The device comprises a base plate 14 having a thruhole into which a piece to be measured is positioned.

In FIG. 1, the vertical cross-sectional axis of the outer diameter to 2.1, 2.2, 2.3 of the piece to be measured is shown at 1. The horizontal cross-sectional axis 3, 3.1, 3.2 and 3.3 extends at different levels, in accordance with the varying outer diameter of the piece to be measured. With six equidistantly spaced measuring points provided, they are offset through 60°. To simplify the showing, only three measuring points 4, 5, 6 are indicated in FIG. 1. The other three measuring points are at symmetrical locations at the left hand side of vertical axis 1. If a horizontal support 7 of the measured piece is provided, the surface of this support 7 intersects with vertical axis 1 at a point of intersection 8 coinciding with the lowermost point of the varying outer diameter 2, 2.1, 2.2, 2.3 of the measured piece. A straight line 9 extending from measuring point 4 of diameter 2 passes through measuring point 4.1 of diameter 2.1, through measuring points 4.2 and 4.3 of diameters 2.2 and 2.3, and intersects with vertical axis 1 at the point of intersection 8. Straight lines 10 and 11 similarly pass through measuring points 5, 5.1, 5.2, 5.3, or 6, 6.1, 6.2, 6.3 of diameters 2, 2.1, 2.2, 2.3 and intersect with vertical axis 1, all at point 8. If a V support 12 is provided and the measured pieces have outer diameters 2.11, 2.22, 2.53, those with smaller diameters come into a lower position. Therefore, the respective points of intersection 13 of straight lines 9.1, 10.1, 11.1 with vertical axis 1 are correspondingly displaced downwardly.

Measuring points 4.11, 4.22, 4.33, 5.11, 5.22, 5.33, 6.11, 6.22, 6.33 are displaced downwardly at the same time. The geometrical relations, however, remain the same as with a horizontal support.

Figure 2:
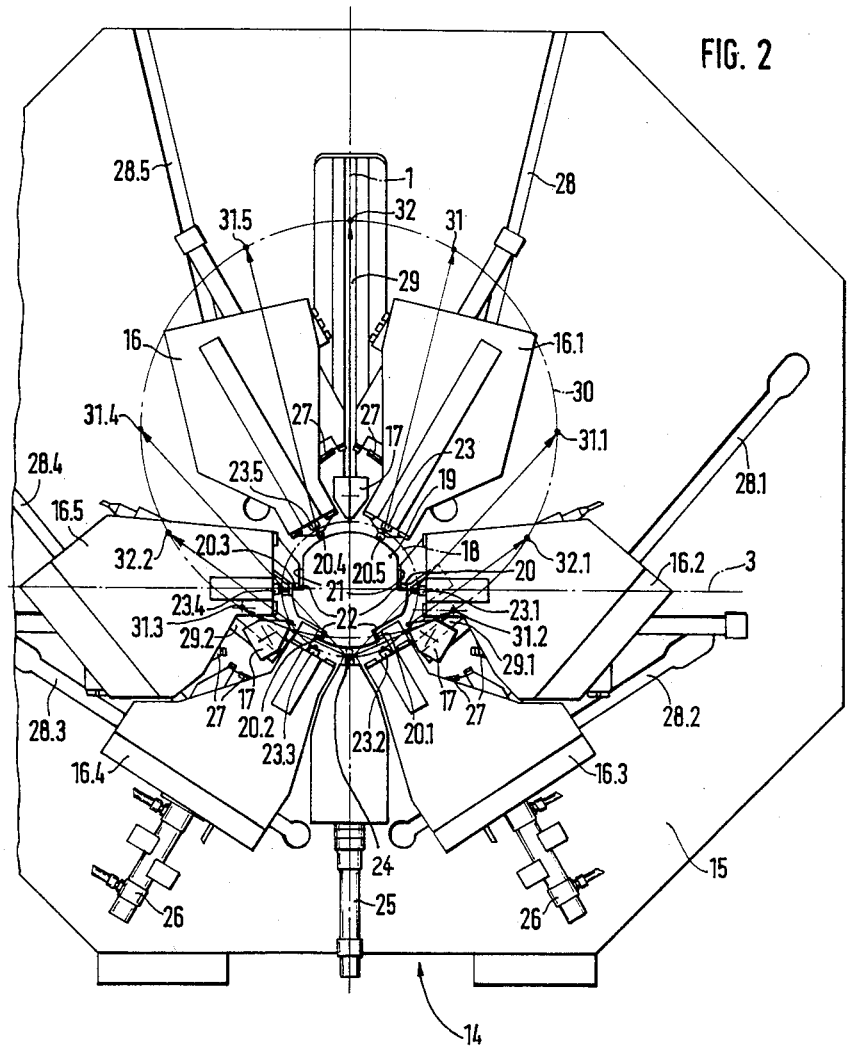
FIG. 2 is a partial top plan view of a measuring head constructed in accordance with the invention.

FIG. 2 shows an embodiment of a measuring head for thread measuring machines, based on the diagram of FIG. 1, permitting a centric adjustment of clamping and measuring elements and measured pieces of various diameters, without any necessity of changing the mutual position of the measuring head and the measured piece. Substantially, measuring head 14 comprises a base plate 15 having a thruhole, and measuring stations and clamping elements which are linearly displaceable on the base plate.

The provided six measuring stations 16, 16.1, 16.2, 16.3, 16.4, 16.5, and three clamping elements 17 are shown in contact with the smallest 18 of the indicated outer diameters.

A centering disc 19 is mounted centrically of diameter 18, and is designed with recesses 21 forming contact faces 22 which extend at right angles to the circumference of the disc and are to be contacted by four lower feelers 20, 20.1, 20.2, 20.3. Two upper feelers 20.4, 20.5 are intended to contact the circumferential face of centering disc 19. The six feelers are equidistantly distributed over the circumference, i.e. set off through 60°. The three clamping elements 17 are offset thrugh 120° relative to each other, with the upper clamping element 17 extending in vertical axis 1, and they apply against the outer diameter 18 of the measured piece. Six measuring elements 23, 23.1, 23.2, 23.3, 23.4, 23.5 again spaced through 60° are in the same angular positions at out diameter 18 as feelers 20, 20.1, 20.2, 20.3, 20.4, 20.5, namely at intermediate locations between clamping elements 17. Two of the measuring elements are at opposite locations on horizontal axis 3. In vertical axis 1, a locator pin 24 is mounted for contacting the lowermost portion of outer diameter 18 of a measured piece.

Locator pin 24 and the measuring elements are equipped each with an actuator cylinder 25, 26. The measuring elements are further equipped each with a spring parallelogram 27, for disengaging from their contact positions. Base plate 15 is provided with straight grooves 28, 28.1, 28.2, 28.3, 28.4, 28.5 in which the measuring stations are displaceable. The grooves extend parallel to the straight lines 9, 10, 11, shown in FIG. 1. Along with the measuring stations, the measuring elements and the feelers, forming a part thereof, are displaced. Clamping elements 17 also are mounted for displacement along straight paths in grooves 29, 29.1, 29.2, which are parallel to straight lines connecting their contact points with point of intersecion 13.

The contemplated larger outer diameter 30 of a piece to be measured is indicated by a broken line. The corresponding measuring points are indicated at 31, 31.2, 31.3, 31.4, 31.5 and the displaced contact points of clamping elements 17 are indicated at 32, 32.1, 32.2.

To perform the measuring operation, first, the measuring stations 16 with the measuring elements 23 and the feelers 20, as well as the clamping elements 17 and the locator pin, are brought into their outer positions. The piece to be measured is placed on the support in front of measuring head 14. A centering disc 19 of a size corresponding to the outer diameter of the piece to be measured is inserted into the measuring head. Feelers 20, 20.1, 20.2, 20.3, 20.4, 20.5 are moved inwardly until they contact contact faces 22 of centering disc 19. This motion is along straight lines defined by grooves 28, 28.1, 28.2, 28.3, 28.4, 28.5. By means of clamping elements 17, which again are moved inwardly in grooves 29, 29.1, 29.2, the measured piece is centered. Measuring head 14 is then moved in the axial direction along the measured piece until locator pin 24 comes into a predetermined measuring position, where the axial movement of the measuring head is stopped. Measuring elements 23, 23.1, 23.2, 23.3, 23.4, 23.5 are then brought into their measuring positions and the results of measurement, namely the parameters: radius, pitch, angle of lead, depth, flat, taper, form, are inductively delivered for evaluation.

While specific embodiments of the invention have been shown and described in detail to illustrate the application of the principles of the invention, it will be understood that the invention may be embodied otherwise without departing from such principles.

What is claimed is:

1. A measuring head for screw thread measuring machines capable of measuring threads of a piece to be measured which has an outer diameter with a measuring point and which may be of any size within a predetermined limit, comprising a base plate having a thruhole and a plurality of straight support grooves extending thereover, clamping and measuring elements displaceably received in said support grooves, said plate having a vertical cross-sectional axis of its thruhole which coincides with the vertical axis of the outer diameter of the measured piece clamping and measuring elements being uniformly distributed around the outside diameter of said measured piece, and being displaceable in an associated support groove from an outer position into an inner position to contact the measured piece at a measuring point, said support grooves extending parallel to a straight line connecting a measured point at the outer diameter of the measured piece with a point at which the vertical cross-sectional axis of the outer diameter of the measured piece and the lower circular arc of the measured piece intersect.

2. A measuring head according to claim 1, including a support on said base plate forming a V-channel on which the measured piece is supported, said measured piece having a point of intersection from the point of measurement to the lowermost point of the outer diameter which intersects the vertical axis which is displaced downwardly in proportion to the reduced size of a measured piece having diminishing outer diameter.

3. A measuring head according to claim 1, wherein said clamping elements are offset from each other by 120° and including one clamping element which is displaceable adjacent the upper portion of the measured piece along a vertical axis.

4. A measuring head according to claim 1, wherein said measuring elements are offset relative to each other by 60° and wherein there are at least two measuring elements which are mounted at opposite locations of each of respective sides of said piece to be measured on the horizontal axis of the measured piece.

5. A measuring head according to claim 1, including a centering disc on said base plate adapted to be positioned centrally of the piece to be measured and a feeler movable with said measuring element against a contact face of the centering disc which is conformed to the outer diameter of the measured piece.

6. A measuring head according to claim 5, wherein said centering disc is formed in accordance with the number of feelers by which it is contacted and includes six contact faces which are provided at equally distributed locations around the surface of said disc offset by 60°, two of said contact faces coinciding with the circumferential face of the disc, while the other of said contact faces extending perpendicular to the circumferential face and formed by individual recesses in said centering disc.

7. A measuring head according to claim 1, including a locator pin which is mounted on said base plate for being brought into contact with the measured piece in its lowermost portion at the intersection of the diameter of the measured piece at the vertical cross sectional axis and determines the measuring position of the piece during the axial displacement thereof.

8. A measuring head according to claim 1, wherein the measuring elements and the feelers are combined to assemblies forming individual stations which are mounted on said base plate for displacement along said grooves.

9. A measuring head according to claim 7, including actuator cylinders on said base plate and wherein said locator pin and said measuring elements are associated with actuator cylinders.

* * * * *